United States Patent
Johansson et al.

(10) Patent No.: US 10,329,733 B2
(45) Date of Patent: Jun. 25, 2019

(54) METHOD AND ELECTRONIC CONTROL UNIT FOR DETERMINING A VERTICAL POSITION

(71) Applicant: CPAC SYSTEMS AB, Göteborg (SE)

(72) Inventors: Magnus Johansson, Torslanda (SE); Per Björe Dahl, Göteborg (SE)

(73) Assignee: CPAC Systems AB, Göteborg (SE)

( * ) Notice: Subject to any disclaimer, the term of this patent is extended or adjusted under 35 U.S.C. 154(b) by 0 days.

(21) Appl. No.: 15/576,808

(22) PCT Filed: Jun. 16, 2015

(86) PCT No.: PCT/SE2015/050704
§ 371 (c)(1),
(2) Date: Nov. 25, 2017

(87) PCT Pub. No.: WO2016/204660
PCT Pub. Date: Dec. 22, 2016

(65) Prior Publication Data
US 2018/0305890 A1    Oct. 25, 2018

(51) Int. Cl.
*E02F 9/26* (2006.01)
*E02F 3/43* (2006.01)
(Continued)

(52) U.S. Cl.
CPC ............ *E02F 3/435* (2013.01); *E02F 9/2025* (2013.01); *E02F 9/2029* (2013.01); *E02F 9/26* (2013.01);
(Continued)

(58) Field of Classification Search
CPC ...... E02F 9/26; E02F 9/20; E02F 3/34; G01L 5/00; G01G 19/08
(Continued)

(56) References Cited

U.S. PATENT DOCUMENTS 4,354,797 A * 10/1982 Hirose ................... E02F 3/437
                                                                 414/700
5,065,326 A * 11/1991 Sahm ..................... E02F 3/437
                                                                 340/686.1
(Continued)

FOREIGN PATENT DOCUMENTS

EP        0979901 A1    2/2000
JP        S60133125 A   7/1985
(Continued)

OTHER PUBLICATIONS

International Search Report (dated Feb. 25, 2016) for corresponding International App. PCT/SE2015/050704.
(Continued)

*Primary Examiner* — Tan Q Nguyen
(74) *Attorney, Agent, or Firm* — WRB-IP LLP (57) ABSTRACT

A method is provided for determining the vertical position of at least a point of a ground portion using a work machine including an implement. The work machine further includes a position determining arrangement adapted to determine at least the vertical position of the implement and a force determining arrangement adapted to determine a force applied to the implement. The method includes determining a contact force value indicative of a contact force between the ground portion and the implement using the force determining arrangement, determining whether or not the contact force value is within a predetermined contact force value range, and if it is determined that the contact force value is within the predetermined contact force value range, using the position determining arrangement for determining at least the vertical position of a portion of the implement which is in contact with the ground portion.

17 Claims, 5 Drawing Sheets

(51) Int. Cl.
*G01L 5/00* (2006.01)
*E02F 9/20* (2006.01)
*G01C 5/00* (2006.01)
*G01F 22/00* (2006.01)
*G01G 19/08* (2006.01)
*E02F 3/32* (2006.01)
*E02F 3/96* (2006.01)

(52) U.S. Cl.
CPC .............. *E02F 9/265* (2013.01); *G01C 5/00* (2013.01); *G01F 22/00* (2013.01); *G01L 5/0061* (2013.01); *E02F 3/32* (2013.01); *E02F 3/964* (2013.01); *G01G 19/08* (2013.01)

(58) Field of Classification Search
USPC .......................................................... 701/50
See application file for complete search history.

(56) References Cited

U.S. PATENT DOCUMENTS

| | | |
|---|---|---|
| 5,461,803 A | 10/1995 | Rocke |
| 5,595,471 A * | 1/1997 | Ajilore ................. E02F 3/3408 414/685 |
| 5,752,333 A * | 5/1998 | Nakagawa .............. E02F 3/437 172/2 |
| 5,768,810 A | 6/1998 | Ahn |
| 5,826,666 A | 10/1998 | Tozawa et al. |
| 5,975,214 A | 11/1999 | Okamura et al. |
| 5,996,702 A | 12/1999 | Hall |
| 6,085,583 A | 6/2000 | Cannon et al. |
| 6,481,124 B1 * | 11/2002 | Miller ................... E02F 3/3618 37/468 |
| 2005/0046599 A1 | 3/2005 | Sahm et al. |
| 2005/0131610 A1 | 6/2005 | Sahm et al. |
| 2010/0161184 A1 | 6/2010 | Marathe et al. |
| 2014/0088838 A1 | 3/2014 | Furem et al. |

FOREIGN PATENT DOCUMENTS

| | | |
|---|---|---|
| JP | 2011262338 A | 12/2011 |
| WO | 2012054987 A1 | 5/2012 |
| WO | 2013042087 A1 | 3/2013 |

OTHER PUBLICATIONS

European Official Action (dated Jan. 9, 2019) for corresponding European App. EP 15 89 5760.

* cited by examiner

METHOD AND ELECTRONIC CONTROL UNIT FOR DETERMINING A VERTICAL POSITION

BACKGROUND AND SUMMARY

The present disclosure relates to a method for determining the vertical position of at least a point of a ground portion using a work machine comprising an implement. Moreover, the present disclosure relates to a method for leveling a ground area using a work machine comprising an implement. Further, the present disclosure relates to a method for determining a volume of a material entity that is moved from a material body by an implement of a work machine. Additionally, the present disclosure relates to each one of a computer program, a computer readable medium, an electronic control unit, a work machine control system and a work machine.

When performing ground modifying operations, such as leveling or material moving operations such as excavating, using a work machine, it may be desired to obtain information as regards the position of a ground portion that has been modified or which is to be modified.

To this end, U.S. Pat. No. 5,996,702 proposes a method for operating a work machine tool in which the location of at least a portion of the work machine tool is determined and used for estimating an end result of the work machine tool operation.

However, it would be desired to improve the method as proposed in U.S. Pat. No. 5,996,702.

It is desirable to provide a reliable and/or versatile method for obtaining information as regards the position of a ground portion.

As such, the present disclosure relates to a method for determining the vertical position of at least a point of a ground portion using a work machine comprising an implement. The work machine further comprises position determining means adapted to determine at least the vertical position of the implement and force determining means adapted to determine a force applied to the implement.

The method comprises:

determining a contact force value indicative of a contact force between the ground portion and the implement using the force determining means;

determining whether or not the contact three value is within a predetermined contact force value range, and if it is determined that the contact force value is within the predetermined contact force value range, using the position determining means for determining at least the vertical position of a portion of the implement which is in contact with the ground portion.

The above method implies a reliable way of determining whether or not at least a portion of the implement is in contact with the ground portion. This in turn implies that reliable information may be obtained, as regards the ground portion position.

As used herein, the expression "range" is intended to encompass closed ranges as well as open ranges. For instance, an open range may have an endpoint the absolute value of which is infinity resulting in that the above discussed feature of determining whether or not the contact force value is within a predetermined contact force value range corresponds to a feature of determining whether or not the absolute value of the contact three value is equal to or above a predetermined contact force value threshold value.

Optionally, the work machine comprises means for moving the implement, the method further comprising:

moving the implement until the contact force value is within the predetermined contact force value range.

The above features imply an appropriate manner of obtaining a desired contact force value.

Optionally, the work machine comprises means for moving the implement in at least a vertical direction.

Optionally, an end point of the predetermined contact force value range is indicative of the weight of the implement.

Optionally, the work machine comprises an implement load sensor, and wherein the feature of determining a contact force value comprises using the implement load sensor.

A work machine may be furnished with an implement load sensor for other purposes, e.g. to determine a weight of a load in the implement. As such, the use of the implement load sensor implies that the method according to the present disclosure may be performed without necessarily having to furnish the work machine with an additional sensor the sole purpose of which is to determine the contact force between the ground portion and the implement.

Optionally, the method further comprises transmitting the vertical position to a data receiver.

Optionally, the method further comprises:

determining the horizontal position of a portion of the implement and transmitting the horizontal position to the data receiver.

Optionally, the method further comprises:

using a global navigation satellite system and/or a total station for determining the horizontal position.

Optionally, the implement comprises a material receiving portion, adapted to receive material, and a surrounding portion, adapted not to receive material, the feature of determining a contact force value comprising determining a contact force value indicative of the contact force between the ground portion and a portion of the surrounding portion of the implement.

A second aspect of the present disclosure relates to a method for leveling a ground area using a work machine comprising an implement. The method comprises:

applying a predetermined portion of the implement to the ground portion to thereby level it, and determining the vertical position of at least a point of a ground portion using the method according to the first aspect of the present disclosure.

The second aspect of the present disclosure implies an appropriate way to determine at least the vertical position of a leveled ground portion. For instance, at least the vertical position may be determined using the same tool, viz the implement, as has been used for the leveling procedure.

A third aspect of the present disclosure relates to a method for determining a volume of a material entity that is moved from a material body by an implement of a work machine, the method comprising:

firstly determining the vertical position of at least a point of a ground portion using the method according to the first aspect of the present disclosure and thereafter;

moving the material entity from the material body using the implement, the material entity comprising the ground portion, determining at least the vertical position of a material body surface remaining after the implement has moved through the material body, and determining the volume of the material entity using the vertical position of the ground portion and the vertical position of the material body surface.

The third aspect of the present disclosure implies an appropriate way to determine at least the vertical position of the ground portion before a material moving operation commences. For instance, at least the vertical position may be determined using the same tool, viz the implement, as will be used for the material moving procedure.

Optionally, the method comprises:

firstly determining the vertical position of a plurality of points of the ground portion using the method according to the first aspect of the present disclosure to thereby generate a ground portion surface estimate.

A fourth aspect of the present disclosure relates to a computer program comprising program code means for performing the computing steps of the first, second or third aspects of the present disclosure when the program is run on a computer.

A fifth aspect of the present disclosure relates to a computer readable medium carrying a computer program comprising program code means for performing the computing steps of the first, second or third aspects of the present disclosure when the program product is run on a computer.

A sixth aspect of the present disclosure relates to an electronic control unit for a work machine comprising an implement, the work machine further comprises position determining means adapted to determine at least the vertical position of the implement and force determining means adapted to determine a force applied to the implement, the electronic control unit being adapted to:

determine a contact force value indicative of a contact force between the ground portion and the implement using the force determining means;

determine whether or not the contact force value is within a predetermined contact force value range, and if it is determined that the contact force value is within the predetermined contact force value range, use the position determining means for determining at least the vertical position of a portion of the implement which is in contact with the ground portion.

A seventh aspect of the present disclosure relates to a work machine control system comprising an electronic control unit according to the sixth aspect of the present disclosure.

An eighth aspect of the present disclosure relates to a work machine comprising a work machine control system according to the seventh aspect of the present disclosure.

BRIEF DESCRIPTION OF THE DRAWINGS

With reference to the appended drawings, below follows a more detailed description of embodiments of the invention cited as examples.

In the drawings.

It should be noted that the appended drawings are not necessarily drawn to scale and that the dimensions of some features of the present invention may have been exaggerated for the sake of clarity.

DETAILED DESCRIPTION OF PREFERRED EMBODIMENTS

The invention will be described in the following for a work machine 10 in the form of an excavator such as the one illustrated in FIG. 1. The excavator 10 should be seen as an example of a work machine which could comprise an electronic control unit and/or a work machine control system according to the present invention and/or for which a method according to the present invention could be carried out.

Figure 1:
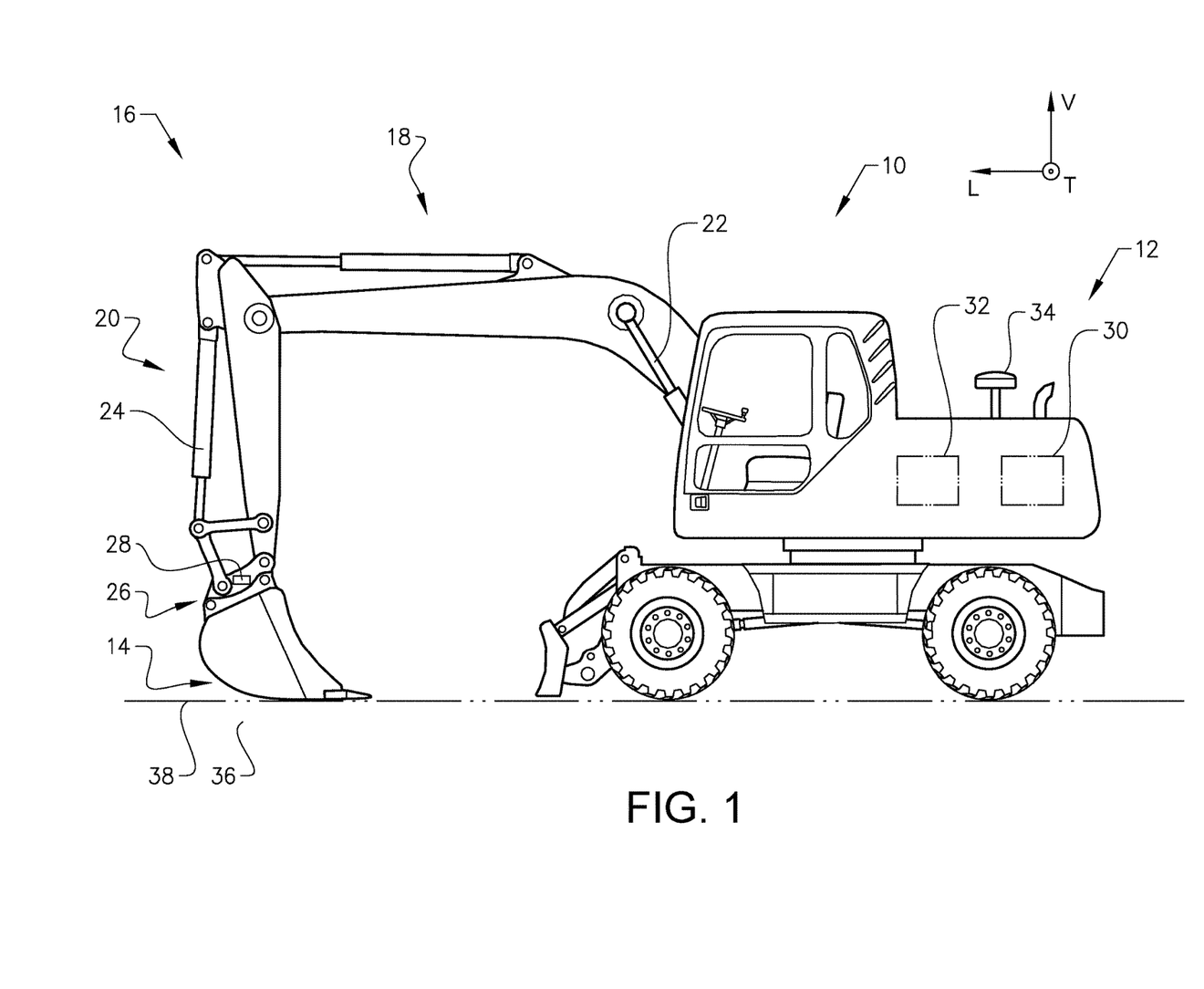
FIG. 1 is a schematic side view of a work machine.

The FIG. 1 work machine 10 comprises a main body 12, an implement 14 and a connector 16 connecting the implement 14 to the main body 12. In FIG. 1, the connector 16 comprises a boom 18 and a stick 20. It should be noted that other work machines may comprise a connector with more or fewer components. For instance, it is envisaged that certain work machines, such as a wheeled excavator, may comprise a first boom (not shown) pivotally connected to the main body, a second boom (not shown) pivotally connected to the first boom and a stick pivotally connected to the second boom.

The main body 12 has a vertical extension in a vertical direction V. Moreover, and as is indicated in FIG. 1, the main body 12 also has an extension in a longitudinal dimension L in the intended drive direction of the work machine 10 and an extension in a transversal dimension T being perpendicular to each one of the vertical and longitudinal dimensions V, L.

Purely by way of example, and as is illustrated in FIG. 1, the boom 18 may be pivotally connected to the main body 12 and may be actuated by a boom actuator 22 connected to each one of the main body 12 and the boom 18. In a similar vein, the stick 20 may be pivotally connected to the boom 16 and may be actuated by a stick actuator 24 connected to each one of the boom 18 and the stick 20. Purely by way of example, at least one, alternatively both, of the boom actuator 22 and the stick actuator 24 may comprise a hydraulic cylinder, such as a double acting hydraulic cylinder. Additionally, the implement 14 may be movable relative to the stick 20 by means of an implement actuator 26, e.g. a hydraulic implement actuator 26. For instance, the implement 14 may be pivotable relative to the stick 20.

Further, the FIG. 1 work machine 10 comprises a force determining means 28 adapted to determine a force applied to the implement 14. In the FIG. 1 embodiment, the force determining means 28 is implemented as an implement load sensor adapted to determine the load of the implement 14. However, it is also envisaged that the force determining means 28 may comprise another type of sensor, e.g. a pressure sensor (not shown).

In the FIG. 1 embodiment, the force determining means 28 is located between the implement 14 and the connector 16, e.g. between the implement 14 and the stick 20. However, it is also envisaged that the force determining means 28 may be located in another position such as the implement 14, e.g. in an implementation of the force determining means 28 which comprises a pressure sensor. Further, embodiments are also envisaged in which the force determining means 28 is located on one of the above discussed actuators 22, 24, 26 or in any of the hydraulic loops (not shown) connected to the actuators 22, 24, 26.

The FIG. 1 work machine 10 further comprises an electronic control unit 30 which may be adapted to control work machine operations and/or to process data relevant for the operation of the work machine 10. As non-limiting and non-exhaustive examples, the feature "processing data" may include one or more of: determining, storing, transmitting or receiving data.

Purely by way of example, the electronic control unit 30 may comprise a computer program comprising program code means for performing the computing steps of any one of the methods that will be presented hereinbelow. For instance, the electronic control unit 30 may comprise a computer readable medium carrying a computer program comprising program code means for performing the computing steps of any one of the methods that will be presented hereinbelow.

Further, the work machine 10 comprises position determining means 32 adapted to determine at least the vertical position of the implement 14. As a non-limiting example, such a vertical position may be determined using information indicative of the current condition, e.g. stroke, of each one of the previously discussed actuators 22, 24, 26.

However, it is also envisaged that implementations of the position determining means 32 also and/or instead may determine the relative angles between the components, e.g. the main body 12, the boom 18, the stick 20 and the implement 14, of the work machine 10. Such an implementation of the position determining means 32 may comprise one of more angle gauges or sensors (not shown) adapted to determine the relative angle between at least two components of the connector 16. As a further alternative, the position determining means 32 may instead, or in addition to any one of the above discussed implementations, comprise one or more inclinometer or a more advanced gauge of similar type.

The electronic control unit 30 may form part of work machine control system. Such a work machine control system may also comprise the above-discussed position determining means 32.

Purely by way of example, and as is illustrated in FIG. 1, the position determining means 12 may be an individual unit in the work machine 10. As another non-limiting example, the position determining means 32 may form part of another unit of the work machine, such as the electronic control unit 30.

Additionally, the embodiment of the work machine 10 illustrated in FIG. 1 comprises a global navigation satellite system 34 adapted to determine the position of the work machine 10. A non-exhaustive list of global navigation satellite systems includes: GPS, GLONASS, Galileo or Beidou. Purely by way of example, instead of, or in addition to, a global navigation satellite system, embodiments of the work machine 10 may comprise another type of assembly for determining the position, e.g. the horizontal position, of the work machine 10, e.g. a Total Station (TS), alternatively an Automatic Total Station (ATS).

FIG. 1 illustrates the work machine in a leveling operation, i.e. when the implement 14 is moved in relation to the ground 36 in order to smoothen the ground surface 38. As a non-limiting example, during a leveling operation, the implement 14 may be moved in a direction substantially parallel to the intended extension plane of the ground surface 38.

However, the FIG. 1 work machine 10 may also be used for other types of operations. Purely by way of example, the work machine 10 may be used in a material moving operation such as digging. As a non-limiting example, a material moving operation may comprise that at least a portion of the implement is moved in a vertical direction as well as a horizontal direction relative to the ground 36 in order to at least partially fill the implement 14 with material.

In an operation, such as any one of the operations presented hereinabove, it may be desired to determine the vertical position of at least a point of a ground portion using a work machine comprising an implement.

Figure 2:
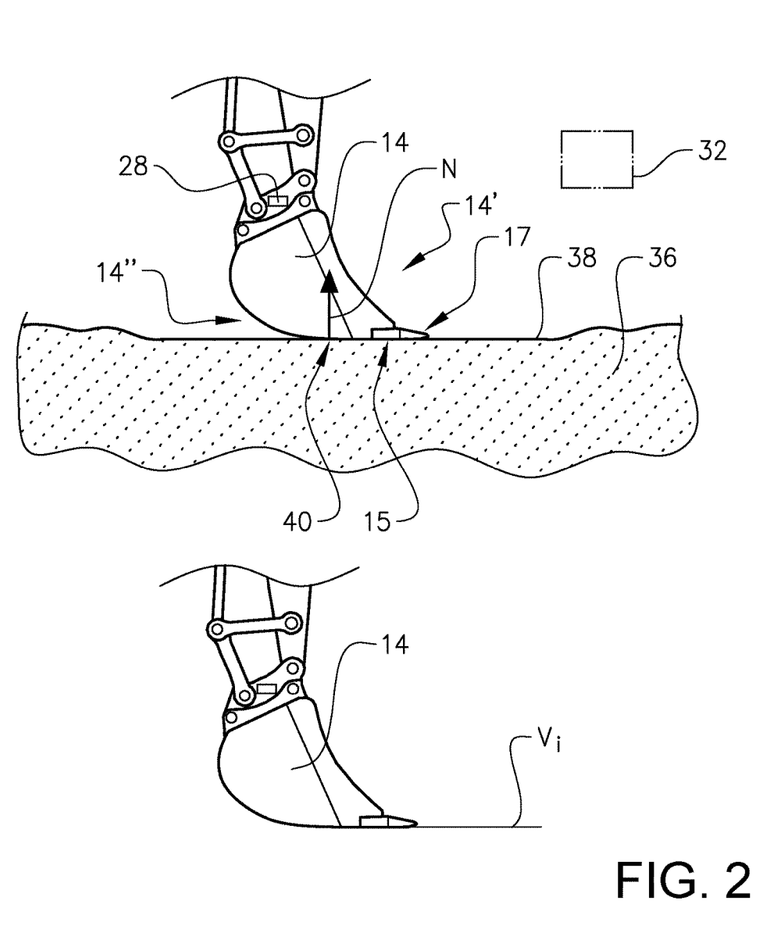
FIG. 2 illustrates an embodiment of a method according to the first aspect of the present invention.

FIG. 2 illustrates an embodiment of a method for determining the vertical position of at least a point of a ground portion 40 using a work machine comprising an implement. The ground portion 40 is a portion, e.g. a point, a delimited area or a delimited volume, of the ground 36. Generally, the ground portion 40 comprises a portion of the ground surface 38.

The method comprises:

S10: determining a contact force value N indicative of a contact force between the ground portion 40 and the implement 14 using the force determining means 28;

S12 determining whether or not the contact force value N is within a predetermined contact force value range, and S14 if it is determined that the contact force value N is within the predetermined contact force value range, using the position determining means 32 for determining at least the vertical position $V_i$ of a portion of the implement 14 which is in contact with the ground portion 40.

Purely by way of example, the method comprising the above steps S10, S12 and S14 may be carried out by a control unit, such as the electronic control unit 30 illustrated in FIG. 1. Moreover, it is also envisaged that a control unit, such as the electronic control unit 30 illustrated in FIG. 1, may be adapted to perform method features and/or to control components of a work machine to perform method features of the below discussed embodiments and/or aspects of the present invention.

A work machine may comprise means for moving the implement 14, for instance means for moving the implement in at least the vertical direction V. As a non-limiting example, such moving means may comprise the above discussed actuators (not shown in FIG. 2). The method may further comprise moving the implement 14 until the contact force value N is within the predetermined contact force value range.

The predetermined contact force value range may be an open range or a closed range. Purely by way of example, an end point of the predetermined contact force value range may be indicative of the weight $W_i$ of the implement. In such an implementation, the range may be formulated in accordance with the following: $W_i \leq N < \infty$. It is also envisaged that other embodiments of the above discussed method may comprise other types of ranges, such as $f_1 \times W_i \leq N \leq f_2 \times W_i$ wherein $f_1$ and $f_2$ are range factors. Purely by way of example, the first range factor $f_1$ may be within the range of $0 < f_1 \leq 1$ and the second range factor $f_2$ may be substantially larger than 1. Although the above discussed range $f_1 \times W_i \leq N \leq f_2 \times W_i$ has been presented as a closed range, it is also envisaged that at least one of the ends may be open.

As has been intimated hereinabove, the force determining means 28 may be implemented as an implement load sensor adapted to determine the load of the implement 14. Such a load sensor may be used for determining the contact force value N indicative of the contact force between the ground portion 40 and the implement 14.

For instance, the implement load sensor may be used such that a determined implement load equal to or less than zero is indicative of that the contact force value N is within a predetermined contact force value range.

FIG. 2 further illustrates that the implement 14 may comprise a material receiving portion 14', adapted to receive material, and a surrounding portion 14", adapted not to receive material. Purely by way of example, and as is indicated in FIG. 2, the surrounding portion 14" may comprise, or even be constituted by, a convex portion.

Further, the feature of determining a contact force value N may comprise determining a contact force value indicative of the contact force between the ground portion 40 and a portion of the surrounding portion 14' of the implement 14.

Furthermore, the feature of determining at least the vertical position $V_i$ of a portion of the implement 14 which is in contact with the ground portion 40 may comprise determining at least the vertical position $V_i$ of a predetermined portion of the implement 14 which is in contact with the ground portion 40. As such, rather than requiring information as regards the shape of the entire implement 14, or even the shape of the entire surrounding portion 14", it may be sufficient to be aware of information as regards the shape and position of a predetermined portion of the implement 14.

Purely by way of example, and as is indicated in FIG. 2, an example of such a predetermined portion of the implement 14 may comprise, or even be constituted by, a substantially flat portion 17 of the surrounding portion 14" of the implement 14. In the FIG. 2 embodiment, the implement may be oriented such that the substantially flat portion 15 is substantially horizontal or inclined with a known angle. The vertical position of the substantially flat portion 15, or the lowest portion of the substantially flat portion 15 in the event that the substantially flat portion 15 is inclined, will then provide an appropriate estimate of the vertical position of the ground portion 40.

Moreover, as another non-limiting example, a lowermost portion of the implement 14 may be regarded as the portion of the implement 14 which is in contact with the ground portion 40. As such, the above discussed feature S14 may comprise using the position determining means 32 for determining at least the vertical position Vi of the lowermost portion of the implement 14.

Instead of, or in addition to, any one of the above-discussed implementations, the feature of determining at least the vertical position $V_i$ of the portion of the implement 14 which is in contact with the ground portion 40 may comprise determining at least the vertical position of a reference portion 17 of the implement 14. Purely by way of example, and as is indicated in FIG. 2, the reference portion 17 of the implement may be a tip of the implement 14.

As such, if at least the vertical position of the reference portion 17 is determined, it is possible to determine the vertical position of the ground portion 40. For instance, if the vertical position of the reference portion 17, the shape of the implement 14 as well as the orientation of the implement 14 is known, it is possible to determine the vertical position of the ground portion 40. As a non-limiting example, the previously discussed substantially flat portion 15 may be located adjacent to the reference portion 17, viz the tip. As such, using information as regards the position of the reference portion 17 and the substantially flat portion 15, it is possible to determine the vertical position $V_i$ of a portion of the implement 14 which is in contact with the ground portion 40.

The determined vertical position $V_i$ of a portion of the implement 14 which is in contact with the ground portion 40, which position $V_i$ for instance may be determined in accordance with any one of the above discussed implementations, is indicative of the vertical position of at least a point of a ground portion 40.

As such, when the vertical position $V_i$ is determined, it may be transmitted to a data receiver (not shown), such as a ground data receiver. Purely by way of example, such a data receiver may be located on the work machine (not shown in FIG. 2) or it may be separate from the work machine. Depending on e.g. the position of the data receiver in relation to the work machine, the above discussed transmission may be achieved by one or more wires or, alternatively, wirelessly.

Further, the method may also comprise determining the horizontal position of a portion of the implement 14 and transmitting the horizontal position to the data receiver. As a non-limiting example, the horizontal position may be determined using the position determining means and/or the global navigation satellite system that have been discussed in hereinabove with reference to FIG. 1.

It is also envisaged that embodiments of the method may comprise transmitting the vertical position $V_i$ and the determined contact force value N to the data receiver. As an example, the vertical position $V_i$ and associated contact force value N may be stored in pairs in the data receiver. It is also envisaged that embodiments of the method may comprise transmitting information as regards the horizontal position as well as the determined contact force value N together with the vertical position $V_i$.

Figure 3:
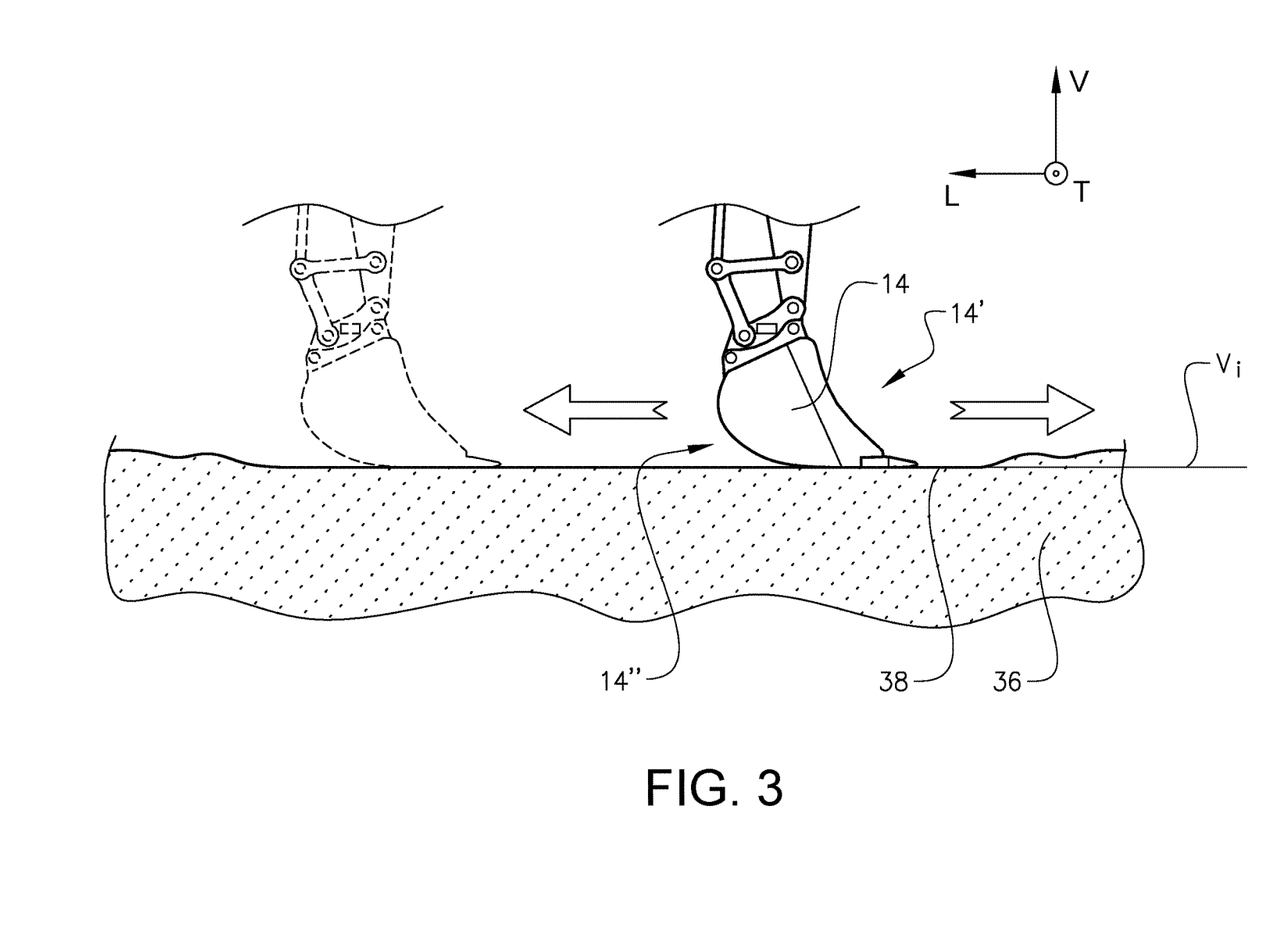
FIG. 3 illustrates an embodiment of a method according to the second aspect of the present invention.

FIG. 3 illustrates an embodiment of a method for leveling a ground area using a work machine comprising an implement. The method comprises applying a predetermined portion 14" of the implement 14 to the ground portion to thereby level it. As is indicated in FIG. 3, the predetermined portion 14" may preferably be the surrounding portion 14" that has been presented hereinabove in relation to FIG. 2. Further, and as is indicated in FIG. 3, the predetermined portion 14" may preferably be a substantially flat portion of the surrounding portion 14".

Moreover, as is indicated by the arrows in FIG. 3, the predetermined portion 14" may be moved in a substantially horizontal direction, viz in a direction in a horizontal plane extending in the longitudinal and transversal dimensions L, T.

Further, the method comprises determining the vertical position $V_i$ of at least a point of a ground portion 40 using the method according to the first aspect of the present disclosure, e.g. the embodiment of the method that has been presented in relation to FIG. 2.

Figure 4:
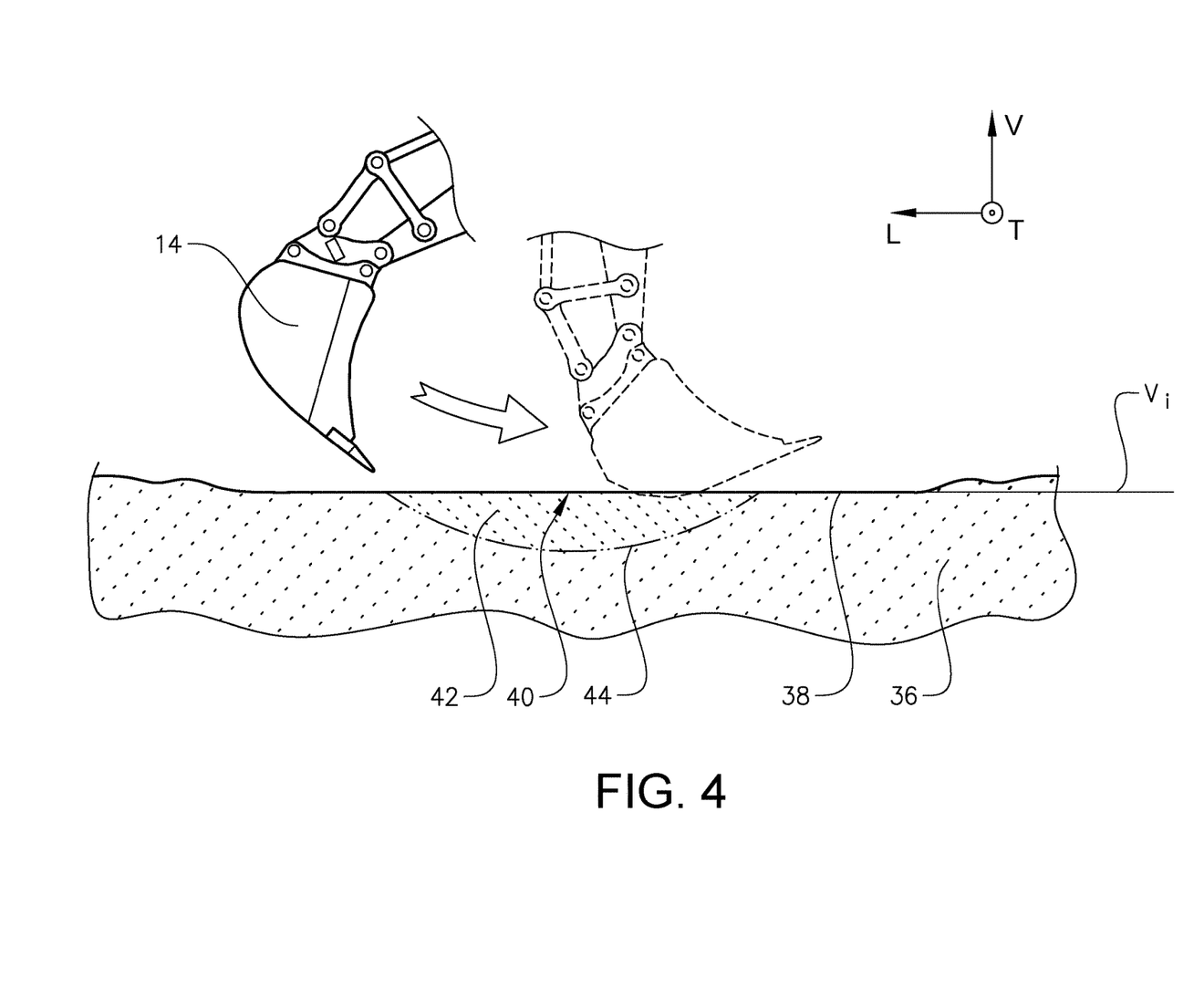
FIG. 4 illustrates an embodiment of a method according to the third aspect of the present invention.

FIG. 4 illustrates an embodiment of a method for determining a volume of a material entity 42 that is moved from a material body by an implement of a work machine.

The method comprises firstly determining the vertical position $V_i$ of at least a point of a ground portion 40 using the method according to the first aspect of the present disclosure, e.g. the embodiment of the method that has been presented in relation to FIG. 2.

FIG. 4 method further comprises, after the vertical position $V_i$ has been determined:

moving the material entity 42 from the material body using the implement 14, the material entity comprising the ground portion 40, determining at least the vertical position of a material body surface 44 remaining after the implement 14 has moved through the material body, and determining the volume of the material entity using the vertical position $V_i$ of the ground portion and the vertical position of the material body surface 40.

It should be noted that the above features of the FIG. 4 method need not necessarily be performed in the order listen hereinabove. For instance, the features of determining at least the vertical position of a material body surface 44 and/or determining the volume of the material entity may be performed simultaneously as the implement 14 moves the material entity 42.

Purely by way of example, the material entity volume may be determined by integrating, analytically or numerically, the volume enclosed by the ground surface 38 and the material body surface 44 over the width of the implement 14. Assuming that the implement 14 has a constant shape throughout its width and also assuming that the ground surface 38 is constant along the width of the implement, the material entity volume may be determined by determining an area enclosed by a line following the material body surface 44 and a line following the ground surface 38 and multiplying the area thus determined by the width of the implement.

The ground surface 38 may be estimated in a plurality of ways. In the embodiment illustrated in FIG. 4, the ground surface 38 is estimated as a horizontal plane the vertical position of which coincides with the vertical position $V_i$ of a single point of the ground portion 40.

Figure 5:
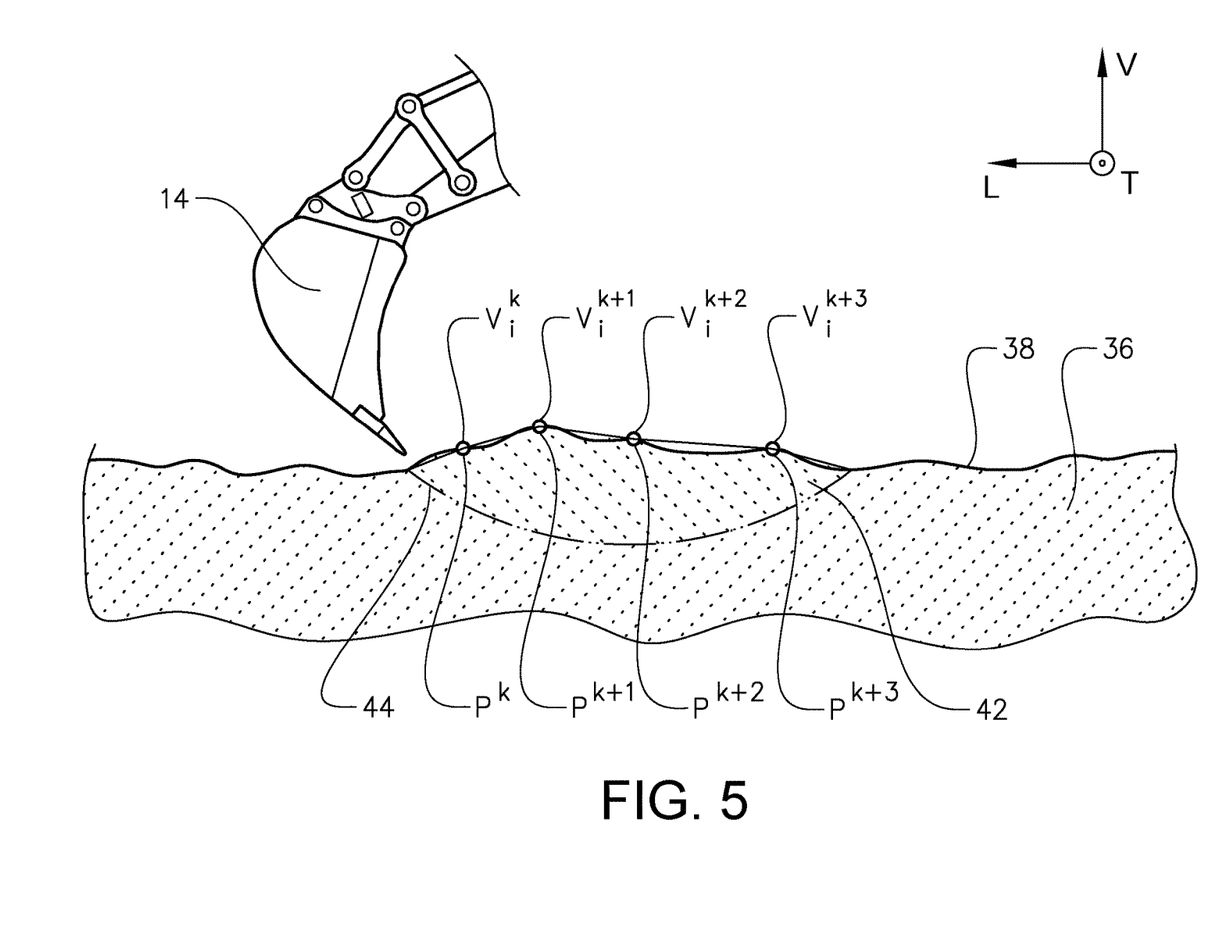
FIG. 5 illustrates another embodiment of a method according to the third aspect of the present invention.

However, FIG. 5 illustrates an alternative embodiment of the method for determining a volume of a material entity 42 which embodiment comprises firstly determining the vertical position of a plurality of points $V^k_i$, $V^{k+1}_i$, $V^{k+2}_i$ of the ground portion 40 using the method according to the first aspect of the present disclosure to thereby generate a ground portion surface estimate. As such, in the FIG. 4 embodiment, the implement has been positioned at various positions $p^k$, $p^{k+1}$, $p^{k+2}$ that are located at a distance from one another in the horizontal plane and for each one of the positions, the vertical position $V^k_i$ is determined using the method according to the first aspect of the present disclosure. Using the vertical positions $V^k_i$, $V^{k+1}_i$, $V^{k+2}_i$ thus determined and the horizontal coordinates of the corresponding points $p^k$, $p^{k+1}$, $p^{k+2}$, an estimate of the ground surface 38 may be generated. As a non-limiting example, such a ground surface estimate may extend in all three dimensions L, T, V.

Once the ground surface estimate has been determined, the material entity volume may be determined, for instance in accordance with the procedure that has been presented hereinabove.

It is to be understood that the present invention is not limited to the embodiments described above and illustrated in the drawings; rather, the skilled person will recognize that many changes and modifications may be made.

The invention claimed is:

1. A method for determining the vertical position of at least a point of a ground portion using a work machine comprising an implement, the work machine further comprises position determining means adapted to determine at least the vertical position of the implement and force determining means adapted to determine a force applied to the implement, the method comprising:
determining a contact force value indicative of a contact force between the ground portion and the implement using the force determining means;
determining whether or not the contact force value is within a predetermined contact force value range, and
if it is determined that the contact force value is within the predetermined contact force value range, using the position determining means for determining at least the vertical position of a portion of the implement which is in contact with the ground portion.

2. The method according to claim 1, wherein the work machine comprises means for moving the implement, the method further comprising:
moving the implement until the contact force value is within the predetermined contact force value range.

3. The method according to claim 1, wherein the work machine comprises means for moving the implement at least a vertical direction.

4. The method according to claim 1, wherein an end point of the predetermined contact force value range is indicative of the weight of the implement.

5. The method according to claim 1, wherein the work machine comprises an implement load sensor, and wherein the feature of determining a contact force value comprises using the implement load sensor.

6. The method according to claim 1, wherein the method further comprises:
transmitting the vertical position to a data receiver.

7. The method according to claim 6, wherein the method further comprises:
determining the horizontal position of a portion of the implement and transmitting the horizontal position to the data receiver.

8. The method according to claim 7, wherein the method further comprises:
using a global navigation satellite system and/or a total station for determining the horizontal position.

9. The method according to claim 1, wherein the implement comprises a material receiving portion adapted to receive material, and a surrounding portion, adapted not to receive material, the feature of determining a contact force value comprising determining a contact force value indicative of the contact force between the ground portion and a portion of the surrounding portion of the implement.

10. A method for levelling a ground area using a work machine comprising an implement, the method comprising:
applying a predetermined portion of the implement to the ground portion to thereby level it, and
determining the vertical position of at least a point of a ground portion using the method according to claim 1.

11. A method for determining a volume of a material entity that is moved from a material body by an implement of a work machine, the method comprising:
firstly determining the vertical position of at least a point of a ground portion using the method according to claim 1 and thereafter:
moving the material entity from the material body using the implement, the material entity comprising the ground portion,
determining at least the vertical position of a material body surface remaining after the implement has moved through the material body, and
determining the volume of the material entity using the vertical position of the ground portion and the vertical position of the material body surface.

12. The method according to claim 11, the method comprising:
firstly determining the vertical position of a plurality of points of the ground portion using the method of claim 1 to thereby generate a ground portion surface estimate.

13. A computer comprising a computer program for performing the steps of claim 1 when the program is run on the computer.

14. A non-transitory computer readable medium carrying a computer program for performing the computing steps of claim 1 when the program product is run on a computer.

15. An electronic control unit, for a work machine comprising an implement, the work machine further comprises position determining means adapted to determine at least the vertical position of the implement and force determining means adapted to determine a force applied to the implement, the electronic control unit being adapted to:
determine a contact force value indicative of a contact force between the ground portion and the implement using the force determining means;
determine whether or not the contact force value is within a predetermined contact force value range, and if it is determined that the contact force value is within the predetermined contact force value range, use the position determining means for determining at least the vertical position of a portion of the implement which is in contact with the ground portion.

16. A work machine control system comprising an electronic control unit according to claim 15.

17. A work machine comprising a work machine control system according to claim 16.

* * * * *